US012597854B2

(12) United States Patent
Ikehara

(10) Patent No.: US 12,597,854 B2
(45) Date of Patent: Apr. 7, 2026

(54) POWER CONVERSION DEVICE

(71) Applicant: Mitsubishi Electric Corporation,
Tokyo (JP)

(72) Inventor: Toru Ikehara, Tokyo (JP)

(73) Assignee: Mitsubishi Electric Corporation,
Tokyo (JP)

( * ) Notice: Subject to any disclaimer, the term of this
patent is extended or adjusted under 35
U.S.C. 154(b) by 309 days.

(21) Appl. No.: 18/466,337

(22) Filed: Sep. 13, 2023

(65) Prior Publication Data

US 2024/0171085 A1      May 23, 2024

(30) Foreign Application Priority Data

Nov. 18, 2022    (JP) ................................. 2022-184499

(51) Int. Cl.
H02M 3/00 (2006.01)
H02M 1/14 (2006.01)
H02M 7/00 (2006.01)

(52) U.S. Cl.
CPC ............. H02M 3/003 (2021.05); H02M 1/14
(2013.01); H02M 7/003 (2013.01)

(58) Field of Classification Search
CPC .. H02M 3/003; H02M 3/33573; H02M 7/003;
H02M 1/14
See application file for complete search history.

(56) References Cited

U.S. PATENT DOCUMENTS

| | | | |
|---|---|---|---|
| 11,431,237 B2 | 8/2022 | Uryu | |
| 2012/0139483 A1* | 6/2012 | Cottet .................. | H05K 1/0295 |
| | | | 174/260 |
| 2020/0083820 A1* | 3/2020 | Yuasa ................. | H02M 7/5387 |
| 2021/0099072 A1 | 4/2021 | Uryu | |

FOREIGN PATENT DOCUMENTS

| | | | |
|---|---|---|---|
| JP | WO2018/193589 A1 | 10/2018 | |
| JP | 6716025 B2 | 7/2020 | |
| WO | WO-2014027536 A1 * | 2/2014 | ......... H05K 7/14329 |

* cited by examiner

*Primary Examiner* — Thienvu V Tran
*Assistant Examiner* — Jennifer C Caulk
(74) *Attorney, Agent, or Firm* — Sughrue Mion, PLLC

(57) ABSTRACT

A power conversion device includes a power conversion
circuit, a smoothing circuit including output capacitors, a
positive-side conductor having a bent structure, and a nega-
tive-side conductor, a positive-side output terminal, a nega-
tive-side output terminal, and a substrate having first and
second substrate connecting parts. The output capacitors are
mounted on the substrate, an end of each of the output
capacitors is connected to the positive-side conductor at a
first substrate connecting part and the other end of it is
connected to the negative-side conductor at a second sub-
strate connecting part. The output capacitors include first
and second capacitors, the shortest distance between the first
and second substrate connecting parts is shorter than an
inter-terminal length of the first capacitor and longer than
that of the second capacitor, and the second capacitor is
mounted between the first and second substrate connecting
parts.

18 Claims, 8 Drawing Sheets

Y Axis    Direction A

→ X Axis

▨ Substrate Pattern

Y Axis

X Axis

▨ Substrate Pattern

▣ Lug Terminal

FIG. 9

POWER CONVERSION DEVICE

TECHNICAL FIELD

The present disclosure relates to a power conversion device.

BACKGROUND ART

In order to ensure an occupant space of a mobile object such as an electric vehicle or an aircraft, a power conversion device mounted on the mobile object is demanded to be downsized. A plurality of power conversion devices is mounted on a mobile object such as an electric vehicle. For example, such a mobile object is equipped with a step-down converter which is a device connected at an input side to a high-voltage battery of several 100 V and for converting and supplying power to a load or auxiliary battery of a 14 V system. The step-down converter includes a plurality of semiconductor switching elements in order to perform power conversion, and switching of the switching elements superimposes ripples or switching noise on an output of the step-down converter. The superimposition of ripples or switching noise on the output of the step-down converter may cause failure of auxiliary electrical components or peripheral devices to which power is supplied.

In order to reduce the ripples and the switching noise, a smoothing circuit unit including a smoothing reactor and a smoothing capacitor, and an output filter unit combining a ferrite core and a capacitor are generally connected to the step-down converter. In the smoothing circuit unit, the ripples can be suppressed. In the output filter unit, both the ripples and the switching noise can be suppressed.

As a document disclosing a filter module for a power conversion device for a power conversion device having such a function, there is a filter module for a power conversion device described in Patent Literature 1. The filter module for the power conversion device module of Patent Literature 1 includes a smoothing circuit unit and a filter circuit unit.

CITATION LIST

Patent Literature

Patent Literature 1: WO 2018/193589 A

SUMMARY OF INVENTION

Technical Problem

However, since the circuit configuration of the filter module for a power conversion device described in Patent Literature 1 includes a smoothing circuit unit and a filter circuit unit, there is a problem that the power conversion device becomes large in size.

The present disclosure has been made to solve such a problem, and it is an object thereof to provide a power conversion device that can be made smaller than the conventional technology.

Solution to Problem

An aspect of a power conversion device according to the embodiments of the present disclosure is a power conversion device comprising: a power conversion circuit including a plurality of semiconductor elements; a smoothing circuit including a plurality of output capacitors, a positive-side conductor having at least one bent structure, and a negative-side conductor; a positive-side output terminal; a negative-side output terminal; and a substrate including a first substrate connecting part and at least one second substrate connecting part, wherein a first end of the positive-side conductor is connected to a positive-side output of the power conversion circuit, and a second end of the positive-side conductor is connected to the positive-side output terminal, a first end of the negative-side conductor is connected to a negative-side output of the power conversion circuit, and a second end of the negative-side conductor is connected to the negative-side output terminal, the plurality of output capacitors is mounted on the substrate, a first end of each of the output capacitors is connected to the positive-side conductor at a first substrate connecting part, and a second end of the each of the output capacitors is connected to the negative-side conductor at the at least one second substrate connecting part, the plurality of output capacitors includes one or more first capacitors and one or more second capacitors smaller in size than the first capacitors, a shortest distance between the first substrate connecting part and the second substrate connecting part on the substrate is shorter than an inter-terminal length of the first capacitor and longer than an inter-terminal length of the second capacitor, and the second capacitor is mounted between the first substrate connecting part and the second substrate connecting part.

Advantageous Effects of Invention

According to a power conversion device of the embodiments of the present disclosure, it is possible to provide a power conversion device that can be made smaller than a conventional power conversion device.

BRIEF DESCRIPTION OF DRAWINGS

FIG. 9 is a circuit configuration diagram according to a second embodiment.

DESCRIPTION OF EMBODIMENTS

Figure 1:
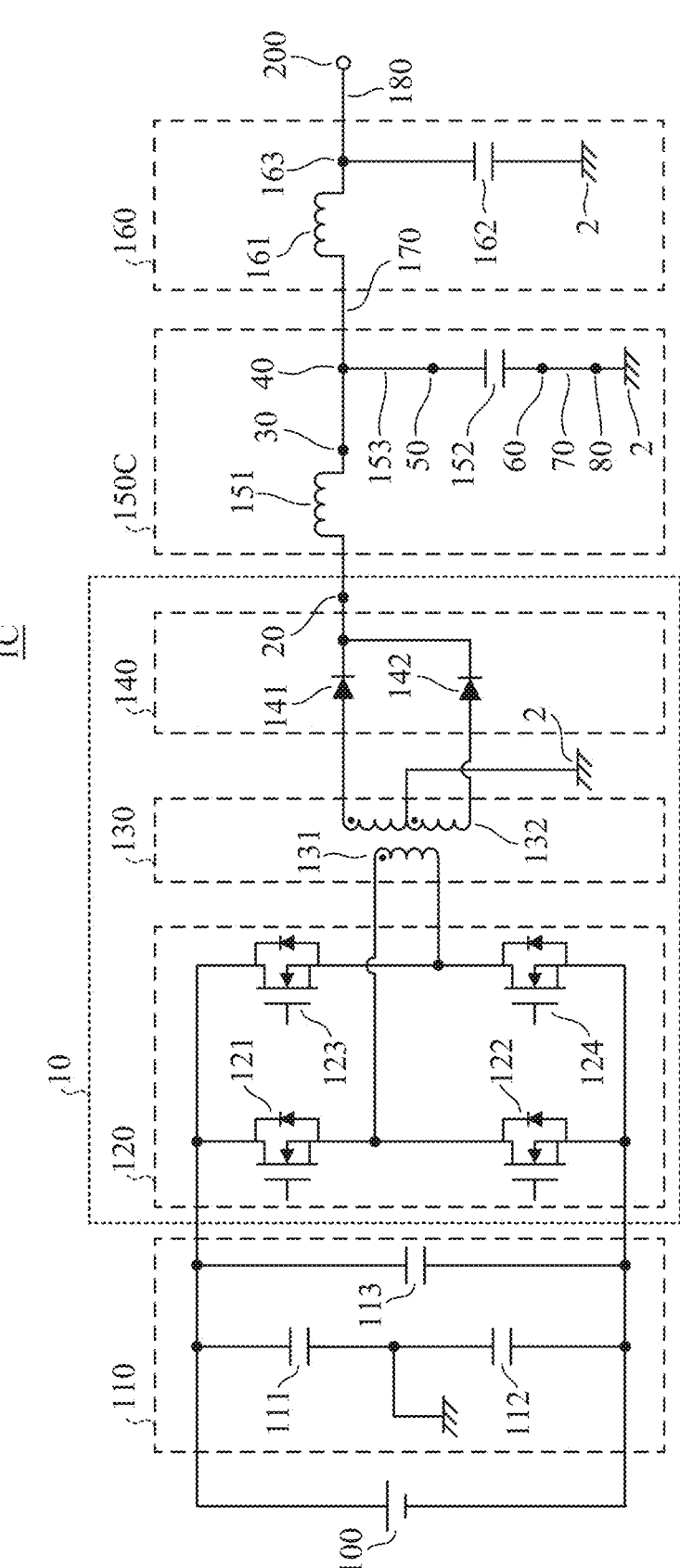
FIG. 1 is a circuit configuration diagram of a power conversion device of a comparative example.

Hereinafter, various embodiments of the present disclosure will be described in detail with reference to the accompanying drawings. Note that components denoted by the same or similar reference numerals in the drawings have the same or similar configurations or functions, and redundant description of such components will be omitted.

First Embodiment

Comparative Example

First, in order to better describe the characteristics of a power conversion device of the present disclosure, a circuit diagram of a power conversion device as a comparative example will be described with reference to FIG. 1.

FIG. 1 is a circuit configuration diagram of a power conversion device 1C of a comparative example. As illustrated in FIG. 1, the power conversion device 1C includes an input filter circuit unit 110, a power conversion circuit 10, a smoothing circuit unit 150C, and an output filter unit 160. The power conversion circuit 10 includes a switching circuit unit 120, a transformer unit 130, and a rectifier circuit unit 140.

(Input Filter Circuit Unit)

The input filter circuit unit 110 includes capacitors 111, 112, and 113, and removes a ripple component and a switching noise component propagated to the DC power supply 100.

(Switching Circuit Unit)

The switching circuit unit 120 includes switching elements 121 to 124 connected in a bridge shape. Then, the DC voltage applied from the DC power supply 100 is converted into an AC voltage. Note that the switching elements 121 to 124 are not limited to a self-extinguishing semiconductor switching element such as a silicon (Si)-metal oxide semiconductor field effect transistor (MOSFET), and may be a semiconductor switching element using a wide band gap semiconductor such as silicon carbide (SiC) or gallium nitride (GaN) or a diamond semiconductor.

(Transformer Unit)

The transformer unit 130 includes a primary winding 131 and a secondary winding 132. The transformer unit 130 outputs the AC voltage applied to the primary winding 131 to the secondary winding 132 while isolating the AC voltage.

(Rectifier Circuit Unit)

The rectifier circuit unit 140 includes diodes 141 and 142 as rectifier elements. The rectifier circuit unit 140 rectifies the AC voltage output from the secondary winding 132 of the transformer unit 130 and converts the AC voltage into a DC voltage.

(Smoothing Circuit Unit)

The smoothing circuit unit 150C includes a smoothing reactor 151 and a smoothing capacitor 152. The smoothing circuit unit 150C smooths the ripple superimposed on the DC voltage rectified by the rectifier circuit unit 140 and outputs the smoothed DC voltage to the output filter unit 160.

The smoothing reactor 151 is connected to a positive-side output of the rectifier circuit unit 140, that is, a positive-side output of the power conversion circuit 10 at a connection point 20. Further, the smoothing reactor 151 and a positive-side output bus bar (positive-side conductor) 170 connecting the smoothing reactor 151 and an output terminal 200 are connected at a connection point 30. Thus, the positive-side output bus bar 170 is connected to the positive-side output of the power conversion circuit 10 via the smoothing reactor 151.

The smoothing capacitor 152 is mounted on a substrate 500 (see FIG. 2B), and is connected between the positive-side output bus bar 170 and GND 2. The positive-side output bus bar 170 is connected to a wiring member 153 at the positive-side output connection point 40, and connected to the substrate 500 via the wiring member 153 at a first substrate screwing part 50. Note that the first substrate screwing part 50 corresponds to the connection point 50 of the comparative example. Accordingly, the positive-side output bus bar 170 is connected to the smoothing capacitor 152 mounted on the substrate 500 via the positive-side output connection point 40, the wiring member 153, and first substrate screwing part 50.

Further, the substrate 500 and the GND 2 are connected via a negative-side conductor 70 from a second substrate screwing part 60 to a connection point 80.

(Output Filter Unit)

The output filter unit 160 includes a ferrite core 161 and a capacitor 162. The output filter unit 160 reduces the ripple and the switching noise superimposed on the DC voltage smoothed by the smoothing circuit unit 150C, and outputs the DC voltage with the ripple and the switching noise reduced to the output terminal 200. Note that the ferrite core 161 is disposed so as to be penetrated by the positive-side output bus bar 170 connecting the positive-side output connection point 40 and the output terminal 200. The capacitor 162 is connected between a branch point 163 between the ferrite core 161 and the output terminal 200 and the GND 2.

Note that the input filter circuit unit 110, the switching circuit unit 120, the transformer unit 130, the rectifier circuit unit 140, the smoothing circuit unit 150C, and the output filter unit 160 are fixed to a conductor casing. The casing itself has the same potential as the GND. Therefore, a negative-side output of the rectifier circuit unit 140, that is, a negative-side output of the power conversion circuit 10 has the same potential as that of the GND 2, and the second substrate screwing part 60 is connected to the GND 2 as a casing at the connection point 80 via the negative-side conductor 70.

Figure 2A:
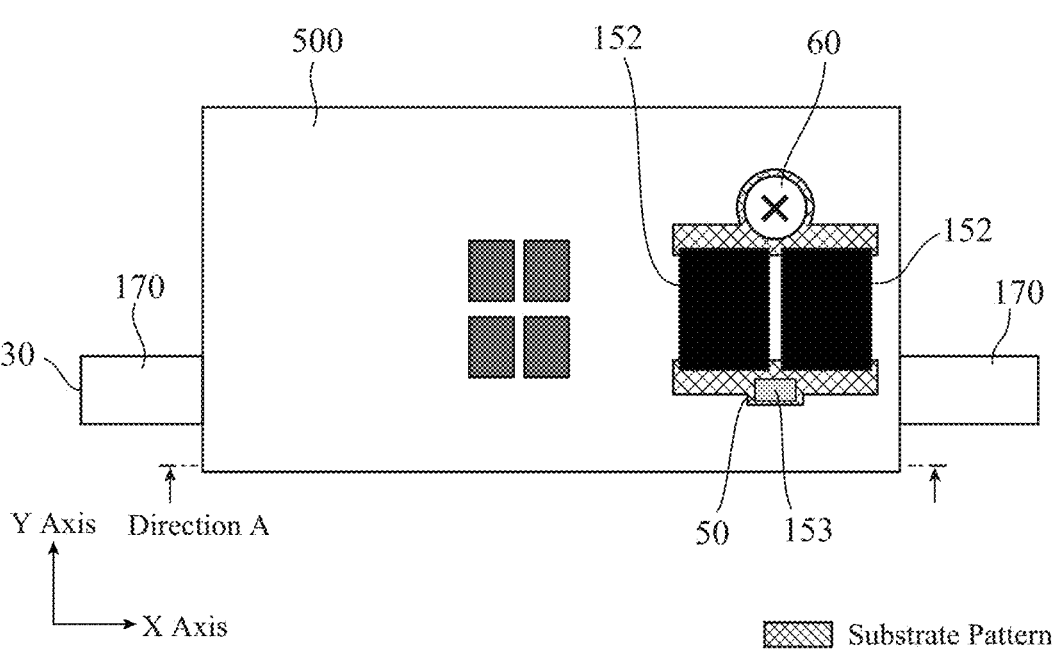
FIG. 2A is a component arrangement diagram on an upper surface of a substrate of a smoothing circuit unit of a comparative example.

FIG. 2A is a layout diagram of the smoothing capacitor 152 of the comparative example. Note that, in FIG. 2A, the smoothing reactor 151 is not illustrated in order to illustrate a characteristic part of the present embodiment. In the smoothing circuit unit 150C and the output filter unit 160, it is necessary to reduce a low frequency ripple (Vrip) of several kHz to several hundred kHz caused by the driving frequency and high frequency switching noise of several hundred kHz to several hundred MHz caused by the switching of the switching element, which are superimposed on the output of the power conversion circuit 10. Here, when Lf is reactance [uH] of a smoothing reactor, Cf is capacitor capacitance [uF] of a smoothing capacitor, Vout is output voltage [V], fsw is switching frequency [Hz], V1 is input voltage [V], and N is a transformer winding number ratio (N1 (primary winding number)/N2 (secondary winding number)) [–], the ripple can be obtained by the following equation (1).

$$V_{rip} = \frac{1}{8} \times \frac{1}{L_f \times C_f} \times \frac{V_{out}}{(2 \times f_{sw})^2 \times V_1} \times N \times \left( V_1 \times \frac{1}{N} - V_{out} \right) \quad (1)$$

The input voltage V1 and the output voltage Vout are external factors, and the turn ratio N is determined by V1 and Vout. In addition, the driving frequency fsw is limited by the performance of the switching element of the power converter and cannot be greatly changed. Therefore, in order to reduce the ripple (Vrip), it is necessary to increase Lf or Cf. Since the smoothing reactor is larger in size and cost than the smoothing capacitor, it is necessary to increase the capacitor capacitance of the smoothing capacitor to some extent in order to reduce the ripple with smaller size and lower cost.

Figure 2B:
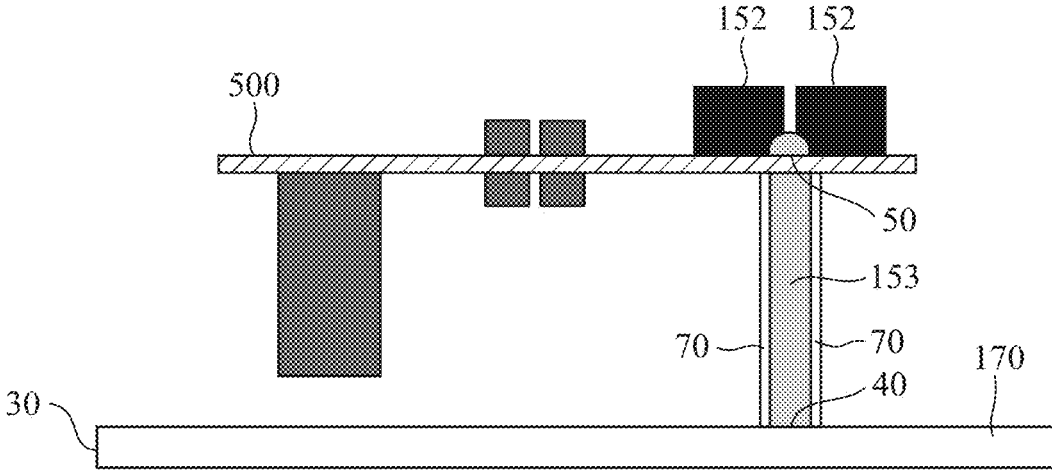
FIG. 2B is a component arrangement diagram in a cross section of a smoothing circuit unit of a comparative example.

FIG. 2B is a cross-sectional view of the smoothing circuit unit 150C of the comparative example taken along a dotted line parallel to the X axis in FIG. 2A as viewed from direction A. Note that, in FIG. 2B, the smoothing reactor 151 is not illustrated in order to illustrate the characteristic part of the present embodiment, but the positive-side output bus bar 170, the negative-side conductor 70, the substrate 500, the smoothing capacitor 152, and other electronic components without reference numerals mounted on the substrate 500 are illustrated. In the comparative example, as illustrated in FIG. 2B, since other electronic components such as a pulse transformer necessary for operating the switching circuit unit 120 are mounted on the substrate 500, and the positive-side output bus bar 170 and the substrate 500 cannot be directly bonded, the wiring member 153 that reaches the connection point 50 from the positive-side output connection point 40 is required to connect the positive-side output bus bar 170 and the substrate 500. As illustrated in FIG. 2B, in the case of the configuration of the comparative example, the wiring member 153 is required, the parasitic inductance of the smoothing capacitor 152 increases, and the filter performance in a high frequency region is low. Therefore, in the power conversion device of the comparative example, the output filter unit 160 illustrated in FIG. 1 is disposed in order to suppress high-frequency switching noise and the like.

Figure 3:
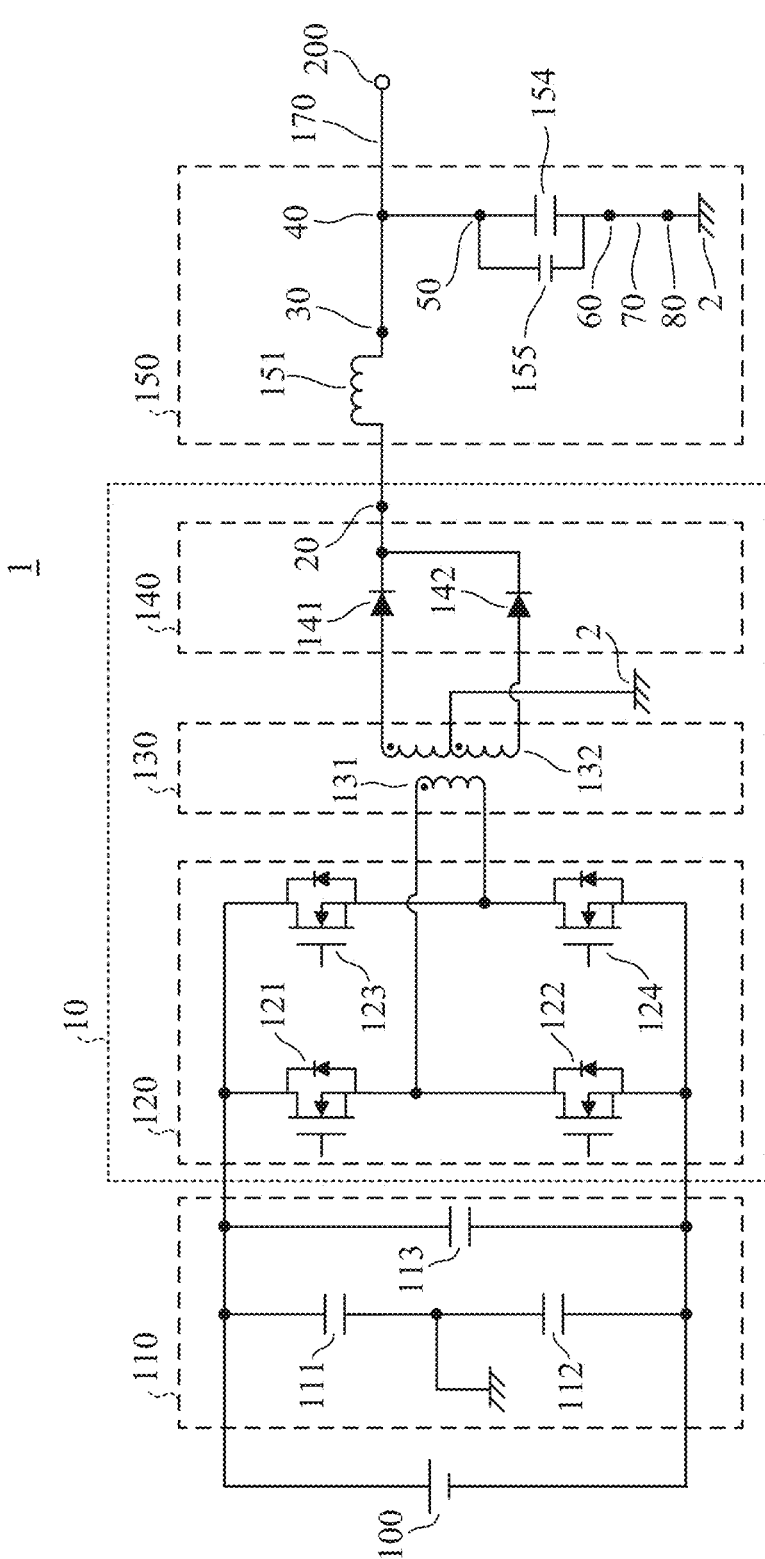
FIG. 3 is a circuit configuration diagram according to a first embodiment.

Next, a circuit diagram according to the first embodiment will be described with reference to FIG. 3. FIG. 3 is a circuit configuration diagram of the power conversion device 1 according to the first embodiment of the present disclosure. The circuit configuration diagram of the power conversion device 1 according to the first embodiment is different from FIG. 1, which is a circuit configuration diagram of a power conversion device 1C of a comparative example, in the following two points. First, while the power conversion device 1C of the comparative example includes the output filter unit 160, the power conversion device 1 of the first embodiment does not include the output filter unit 160. Second, while the smoothing circuit unit 150C of the comparative example includes one type of smoothing capacitor 152, the smoothing circuit unit 150 of the first embodiment includes two types of a smoothing capacitor (first capacitor) 154 and a smoothing capacitor (second capacitor) 155 connected in parallel as output capacitors. The second substrate screwing part 60 on negative sides of the smoothing capacitors 154 and 155 is connected to the GND via the negative-side conductor 70 and has the same potential as GND. In addition, since the configurations other than the smoothing capacitors 154 and 155 are similar to those of the power conversion device of the comparative example illustrated in FIG. 1, the same reference numerals are used and redundant description is omitted.

Figure 4A:
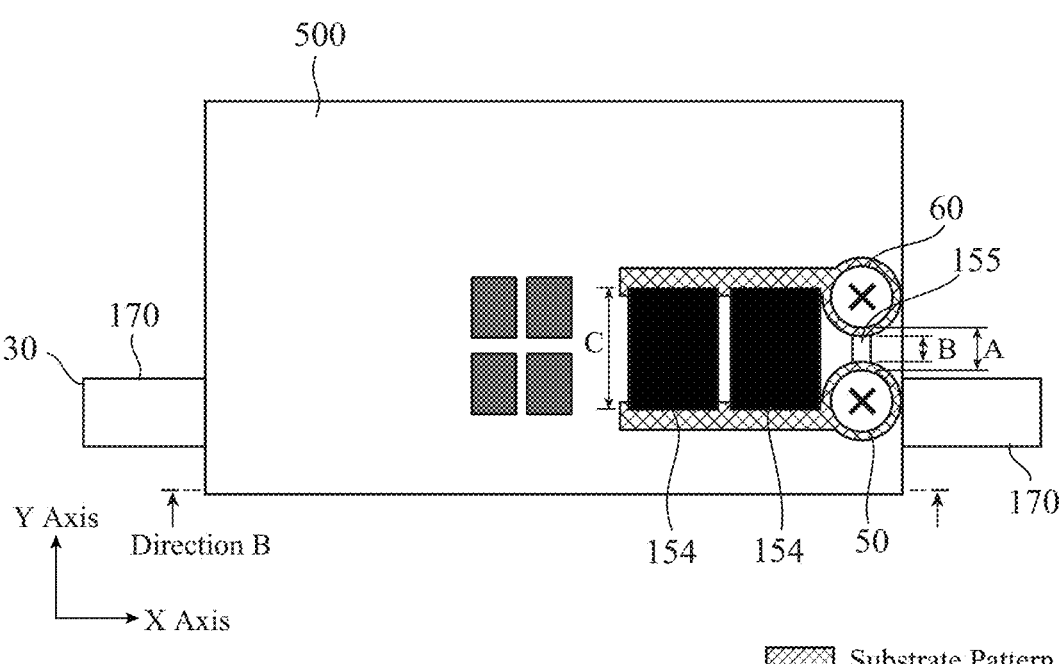
FIG. 4A is an example of a component arrangement diagram on the upper surface of the substrate of the smoothing circuit unit according to the first embodiment.

Next, a specific example of the configuration according to the first embodiment will be described with reference to FIG. 4. Note that, in FIG. 4, the substrate 500, a smoothing capacitor, and a positive-side output bus bar are illustrated in order to illustrate the characteristic part of the present embodiment. FIG. 4A is a layout diagram of the smoothing capacitor according to the first embodiment. As illustrated in FIG. 4A, the second capacitor 155 which is a smoothing capacitor is mounted between the first substrate screwing part 50, which is a screwing part between the positive-side output bus bar 170 and the substrate 500, and the second substrate screwing part 60, which is a screwing part between the negative-side conductor 70 and the substrate 500. The first substrate screwing part 50 and the second substrate screwing part 60 are located at an end portion of the substrate 500. Note that the end portion means a region within a distance where one or several ceramic capacitors can be arranged from the edge of the substrate 500, and a specific distance is equal to or less than about 20 mm. The first capacitor 154 which is a smoothing capacitor is not mounted between the first substrate screwing part 50 and the second substrate screwing part 60, but is mounted in parallel immediately near both the first substrate screwing part 50 and the second substrate screwing part 60. "Immediately near" means near so that the parasitic inductance of the wiring from the substrate screwing part to the capacitor terminal can be minimized. At this time, as illustrated in FIG. 4A, when A is a distance between the first substrate screwing part 50 and the second substrate screwing part 60, B is an inter-terminal distance between terminals of the second capacitor 155, and C is an inter-terminal distance between terminals of the first capacitor 154, the first capacitor 154 and the second capacitor 155 are arranged so as to satisfy B<A<C. As the first capacitor 154, the same one as the smoothing capacitor 152 of the comparative example may be used. This is because, as described above in accordance with equation (1), it is necessary to increase Lf or Cf in order to suppress the ripple, so that a capacitor having a large capacitance density is used. It can be confirmed that the inductance of the loop from the first substrate screwing part 50 to the second substrate screwing part 60 through the first capacitor 154 in FIG. 4A is equal to the inductance of a loop from the first substrate screwing part 50 to the second substrate screwing part 60 through the smoothing capacitor 152 in FIG. 2A which is a comparative example. That is, the ripple can be reduced similarly to the comparative example.

Figure 5:
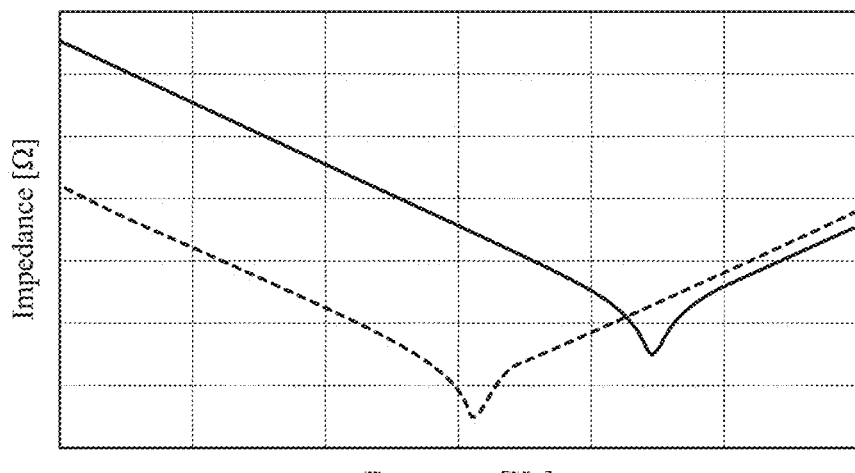
FIG. 5 illustrates frequency characteristics of impedance of a capacitor according to the first embodiment.

On the other hand, as the second capacitor 155, a capacitor that is smaller in size and capacitance than the first capacitor 154 and has improved high-frequency characteristics may be used. FIG. 5 is a graph illustrating impedance frequency characteristics of the first capacitor 154 and second capacitor 155 according to the first embodiment. As illustrated in FIG. 5, the resonance frequency of the second capacitor 155 is higher than the resonance frequency of the first capacitor 154. Since the high frequency filter performance is improved by providing the second capacitor 155 having good high frequency characteristics, it is possible to attenuate the switching noise caused by switching of the switching element without providing the output filter, and it is possible to achieve downsizing and cost reduction of the power conversion device.

In addition, since the first capacitor 154 in FIG. 4A and the smoothing capacitor 152 in FIG. 2A according to the comparative example are the same product, the distance A from the first substrate screwing part 50 to the second substrate screwing part 60 in FIG. 4A is greatly shortened as compared with FIG. 2A of the comparative example. That is, the parasitic inductance is greatly reduced, and high-frequency filter characteristics are improved. Due to this significant improvement in the filter characteristics at high frequencies, the output filter unit is eliminated in the configuration of the first embodiment. The elimination of the output filter unit enables downsizing and cost reduction of the power converter.

In addition, it is preferable that the first capacitor 154 is mounted so that the total distance from one terminal to the first substrate screwing part 50 and from the other terminal to the second substrate screwing part 60 is the shortest in consideration of mounting restrictions. Thus, since terminal parasitic inductance of the smoothing capacitor can be minimized, the filter performance in the high frequency region can be improved, the capacitor capacitance can be further reduced, and the power conversion device can be reduced in size and cost.

Further, on the substrate 500, the first capacitor 154 is mounted on the same side as the second capacitor 155. Thus, since the distance from the first substrate screwing part 50 to the first capacitor 154 and the distance from the second substrate screwing part 60 to the second capacitor 155 are shortened, the terminal parasitic inductance of the smoothing capacitor is reduced, the filter performance can be improved in the high frequency region, and the switching noise can be reduced. Therefore, downsizing and cost reduction of the power conversion device can be achieved.

Figure 4B:
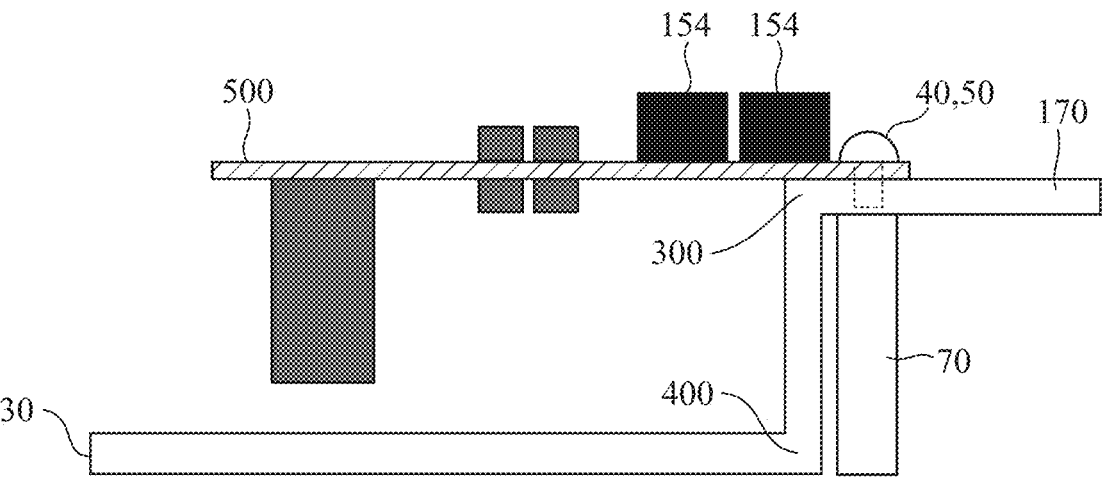
FIG. 4B is an example of a component arrangement diagram in a cross section of the smoothing circuit unit according to the first embodiment.

FIG. 4B is a cross-sectional view of the smoothing circuit unit according to the first embodiment taken along a dotted line parallel to the X-axis in FIG. 4A as viewed from direction B. Note that, here, the smoothing reactor is not described, and the positive-side output bus bar 170, the negative-side conductor 70, the substrate 500, the smoothing capacitors 154 and 155, and other electronic components mounted on the substrate are illustrated. As the smoothing capacitor, while a film capacitor or an electrolytic capacitor is advantageous in order to ensure capacitance, a ceramic capacitor is used in the first embodiment. The ceramic capacitor has higher vibration resistance when mounted on a substrate than a film capacitor or an electrolytic capacitor. In recent years, there is an increasing demand for reliability and quality of in-vehicle power converters, and high vibration resistance is demanded. Both the film capacitor and the electrolytic capacitor require a vibration countermeasure member such as an additional fixing case or an adhesive, which leads to cost increase. Furthermore, since both the film capacitor and the electrolytic capacitor have a higher element height than the ceramic capacitor, the power converter itself becomes large. Since the ceramic capacitor has a small component height, the ceramic capacitor can be mounted on both surfaces of the substrate. In view of these, although the ceramic capacitor has a small capacitance per volume, the use of the ceramic capacitor is appropriate for downsizing and cost reduction of the power conversion device.

As illustrated in FIG. 4B, the positive-side output bus bar 170 has two bent structures 300 and 400. The substrate 500 and the positive-side output bus bar 170 are directly connected by screwing by first substrate screwing part 50 located at an end portion near the edge of the substrate 500. With such a configuration, the wiring member 153 in FIG. 2B according to the comparative example can be eliminated. Since the parasitic inductance of the wiring member 153 is eliminated by the elimination of the wiring member 153, the filter performance can be improved, the capacitor capacitance can be further eliminated, and the power conversion device can be reduced in size and cost.

Figure 6:
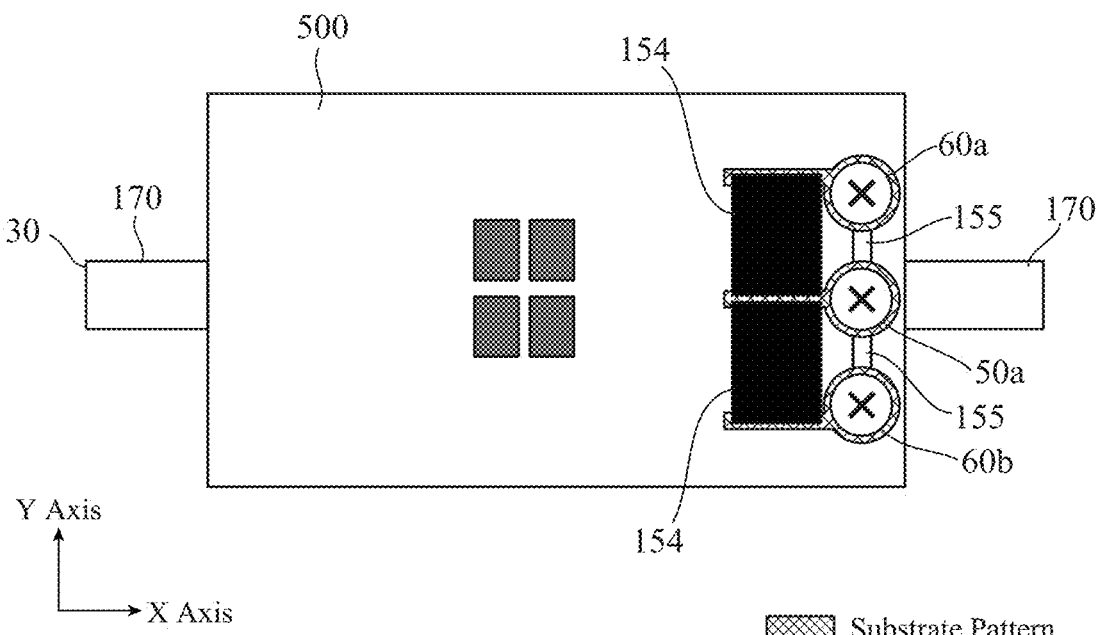
FIG. 6 is an example of a component arrangement diagram on the upper surface of the substrate of the smoothing circuit unit according to the first embodiment.

Next, another specific example of the configuration according to the first embodiment will be described with reference to FIG. 6. FIG. 6 illustrates an arrangement example of smoothing capacitors according to the first embodiment. While the number of the second substrate screwing part 60 for the negative-side conductor 70 and the substrate 500 is one in the example of FIG. 4, two second substrate screwing parts 60a and 60b are provided in the example of FIG. 6. By providing the second substrate screwing part 60 at two positions, the first capacitors 154 can be disposed at a position closer to the second substrate screwing parts 60 (60a, 60b), and the first capacitor and the second capacitor can be mounted between the first substrate screwing part (first substrate connecting part) 50 and the two second substrate screwing parts 60 (second substrate connecting part). As is clear from comparison between FIG. 4A and FIG. 6, in FIG. 4A, of the two first capacitors 154, the first capacitor 154 on the left side with respect to the drawing cannot be arranged closest to the second substrate screwing part 60, but in FIG. 6, both the first capacitors 154 are arranged closest to the screwing part. Further, in FIG. 6, each of the two first capacitors 154 is disposed closer to one of the two second capacitors 155. As described above, by providing the second substrate screwing parts 60 for the negative-side conductor 70 and the substrate 500 at two positions, the first capacitors 154 can be disposed closer to the second substrate screwing part 60, and thus, by reducing the parasitic inductance and improving the filter characteristics, filter components can be eliminated or reduced.

In addition, even in a case where the ripple and the switching noise increase due to the change of the element and the power condition, the filter characteristics are improved by providing two screwing parts between the negative-side conductor and the substrate, and thus it is possible to suppress the ripple and the switching noise without increasing the cost and the size without adding a filter component.

Figures 7, 8:
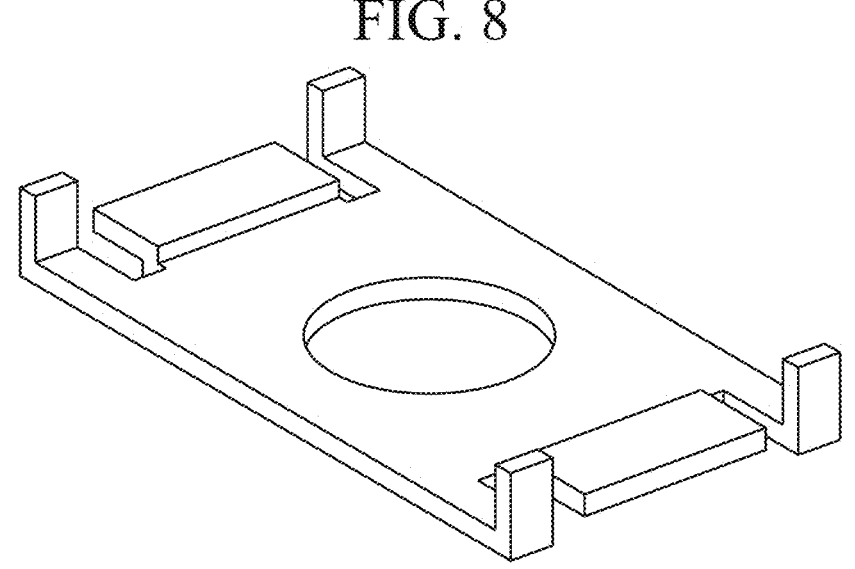
FIG. 7 is an example of a component arrangement diagram on the upper surface of the substrate of the smoothing circuit unit according to the first embodiment.
FIG. 8 is a perspective view of a lug terminal according to the first embodiment.

Next, another specific example of the configuration according to the first embodiment will be described with reference to FIG. 7. FIG. 7 illustrates an arrangement example of the smoothing capacitor and the substrate screwing part (50, 60) according to the first embodiment. In FIG. 7, lug terminals (310, 320; connection members) illustrated in FIG. 8 having substrate connection points with the substrate 500 at the left and right ends of the screwing parts are used for the substrate screwing parts (50, 60). A screwing part between the positive-side output bus bar 170 and the substrate 500 is referred to as a first substrate screwing part 50a, and a screwing part between the negative-side conductor 70 and the substrate 500 is referred to as a second substrate screwing part 60c. FIG. 7 illustrates the substrate 500, the first capacitor 154, the second capacitor 155, the first substrate screwing part 50a, the second substrate screwing part 60c, and the positive-side output bus bar 170. A lug terminal screwed to the positive-side output bus bar 170 is referred to as a first lug terminal 320, and a lug terminal screwed to the negative-side conductor is referred to as a second lug terminal 310. Of the connection points with the substrate 500 at both ends of the first lug terminal 320, the substrate end side is referred to as a first substrate connection point 320a, and the other is referred to as a second substrate connection point 320b. Further, among the connection points with the substrates at both ends of the second lug terminal 310, the substrate end side is referred to as a third substrate connection point 310a, and the other is referred to as a fourth substrate connection point 310*b*. The second capacitor 155 is mounted between the first substrate connection point 320*a* and the third substrate connection point 310*a* and between the second substrate connection point 320*b* and the fourth substrate connection point 310*b*. As described above, by fixing the first lug terminal 320 to the positive-side output bus bar 170 with a screw, the first substrate screwing part 50*a* is connected to the positive-side output bus bar 170 via the first lug terminal 320. Further, by fixing the lug terminal 310 to the negative-side conductor 70 with a screw, the second substrate screwing part 60*c* is connected to the negative-side conductor 70 via the lug terminal 310. Note that the connection using the lug terminals may be performed only for one of the first substrate screwing part 50*a* and the second substrate screwing part 60*c*.

According to the present embodiment, by using the lug terminals having the connection points with the circuit substrate on the left and right of the screwing parts, the connection points between the circuit substrate 500 and the positive-side output bus bar 170 and the negative-side conductor 70 are increased. In addition, the terminal thickness of the smoothing capacitor can be increased by providing two shortest distances between the substrate connection points and mounting the capacitor therebetween. Therefore, the terminal parasitic inductance of the smoothing capacitor is reduced, the filter performance can be improved in the high frequency region, and the switching noise can be reduced. Therefore, downsizing and cost reduction of the power conversion device can be achieved.

Further, in the present embodiment, the substrate 500, the positive-side output bus bar 170, and the negative-side conductor 70 are screwed via the first lug terminal 320 and the second lug terminal 310, respectively. By screwing with screws, respective contact areas between the positive-side output bus bar 170 and the negative-side conductor and the first lug terminal 320 and the second lug terminal 310 increase, and the parasitic inductances between the positive-side output bus bar 170 and the negative-side conductor 70 and the smoothing capacitor decrease. Therefore, in the high frequency region, the filter performance can be improved, and the switching noise can be reduced. Therefore, downsizing and cost reduction of the power conversion device can be achieved.

Second Embodiment

Figure 9:
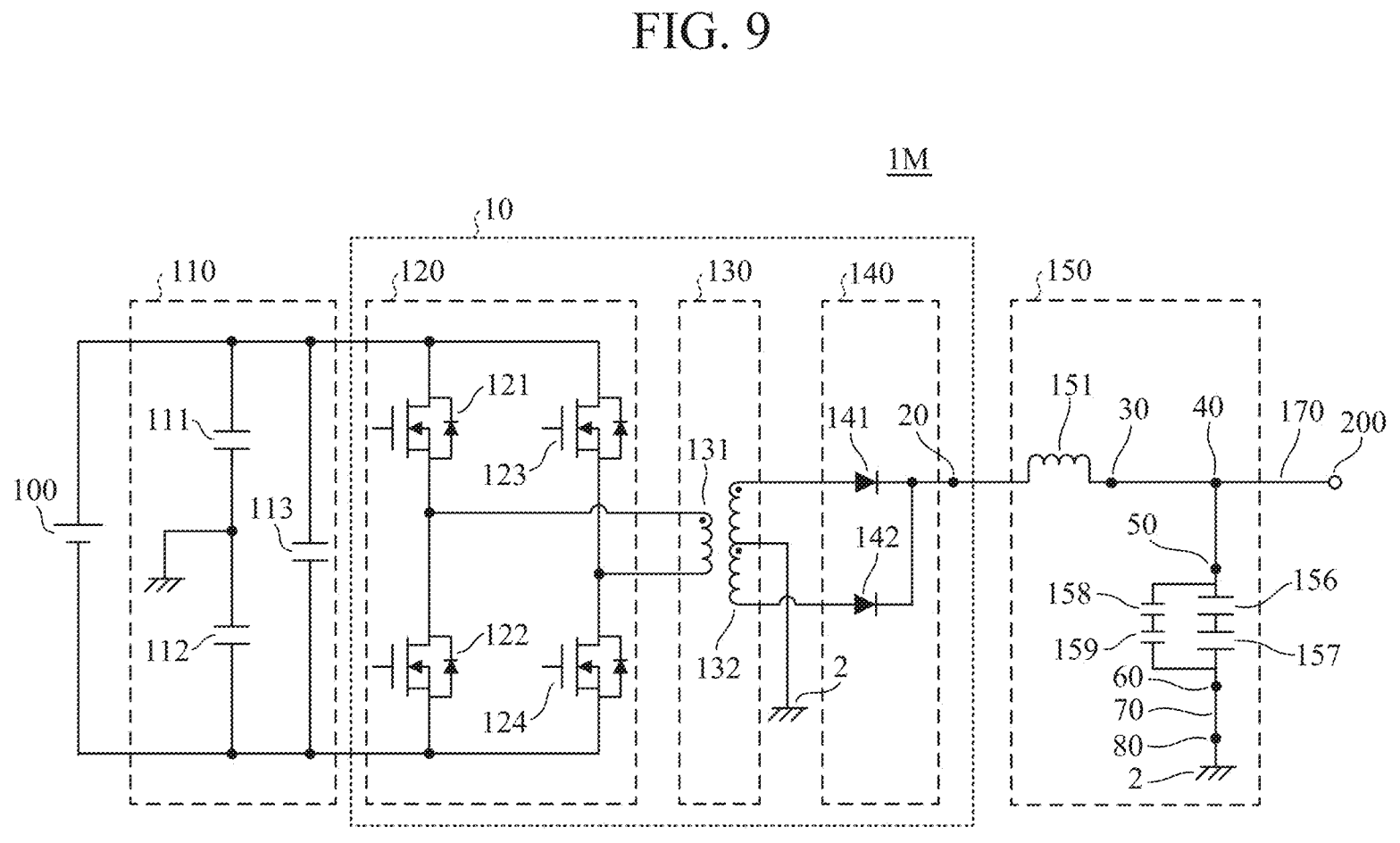

Next, a circuit configuration of a power conversion device 1M according to the second embodiment will be described with reference to FIG. 9. FIG. 9 is a circuit configuration diagram of a power conversion device 1M according to a second embodiment of the present disclosure. The circuit configuration diagram of the power conversion device 1M according to the second embodiment is different from FIG. 3, which is the circuit configuration diagram of the first embodiment, in that the smoothing capacitors are changed to a series configuration. In FIG. 9, the second capacitor has a series configuration of a capacitor 156 and a capacitor 157, and the first capacitor has a series configuration of a capacitor 158 and a capacitor 159. When a surface mount device (SMD) ceramic capacitor is selected as the capacitor connected in parallel with the load, a failure mode of the capacitor is a short circuit failure. In order to prevent a load short circuit at the time of such a short circuit of the capacitor, the capacitor is configured in series. By connecting the capacitors in series, the distance from the positive-side output bus bar 170 to the GND is increased, but since the second capacitor has a smaller volume than the first capacitor, the influence on the terminal length of the smoothing capacitor is small, and the filter performance can be maintained. Since the configuration other than the smoothing capacitor is similar to that in FIG. 3 which is the circuit configuration diagram of the first embodiment, the description thereof is omitted. According to the second embodiment, by connecting the smoothing capacitors in series, it is possible to maintain filter performance equivalent to that of the first embodiment while improving reliability.

Third Embodiment

Figure 10:
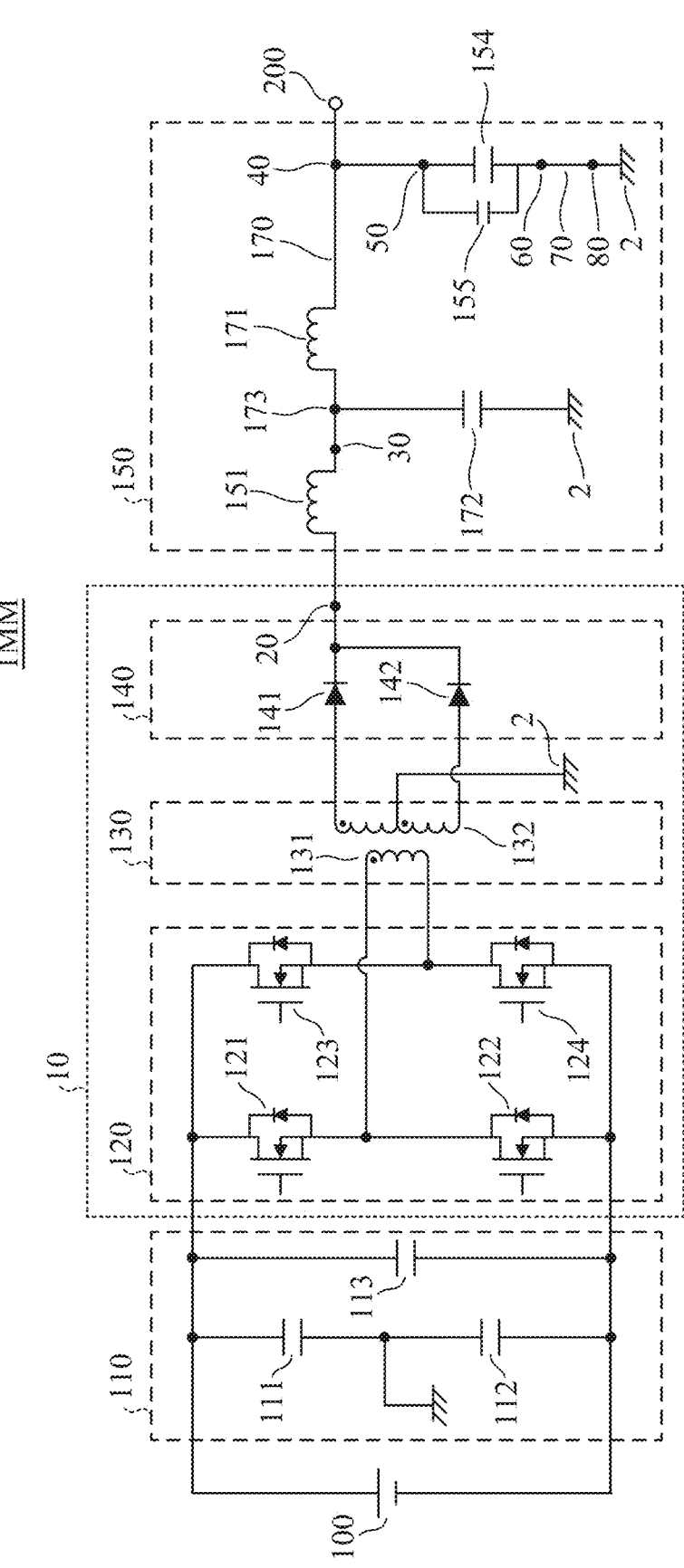
FIG. 10 is a circuit configuration diagram according to a third embodiment.

Next, a circuit configuration of a power conversion device 1MM according to a third embodiment will be described with reference to FIG. 10. FIG. 10 is a circuit configuration diagram of the power conversion device 1MM according to the third embodiment of the present disclosure. The circuit configuration diagram of the power conversion device 1MM according to the third embodiment is changed from that of FIG. 3, which is the circuit configuration diagram of the first embodiment, to a configuration in which a ferrite core 171 and a capacitor 172 are added between the connection point 30 and the positive-side output connection point 40, which is a connection point between the positive-side output bus bar 170 and the first substrate screwing part 50. Since the smoothing reactor 151 is also connected to the connection point 30, the ferrite core 171 is connected to the positive-side output of the power conversion circuit 10 at the connection point 20 via the smoothing reactor 151. The ferrite core 171 is disposed so as to be penetrated by the positive-side output bus bar 170, and the capacitor 172 is connected between a branch point 173 between the connection point 30 and the ferrite core 171 and the GND 2.

The configurations other than the ferrite core 171 and the capacitor 172 are similar to those in FIG. 3, which is the circuit configuration diagram of the first embodiment, and thus the description thereof is omitted. According to the present embodiment, even when the switching noise increases due to element change or specification change, the filter performance can be improved by the added ferrite core 171 and capacitor 172, and even if components are added, the smoothing circuit unit is small, so that downsizing and cost reduction of the power conversion device can be achieved.

Further, the size of the first capacitor in each of the first to third embodiments may be equal to or more than 3216 (3.2 mm×1.6 mm) and equal to or less than 3225 (3.2 mm×2.5 mm). As described above, the first capacitor having a large capacitance density is selected in order to suppress the ripple. Since the capacitance density of the capacitor is basically proportional to the size, the first capacitor is a capacitor having a large size. On the other hand, when the size increases, the vibration resistance at the time of mounting the substrate decreases. As described above, if a structural component is added as a vibration countermeasure, the cost increases. Thus, a capacitor of a size equal to or more than 3216 (3.2 mm×1.6 mm) and equal to or less than 3225 (3.2 mm×2.5 mm) may be selected as a capacitor that does not need vibration countermeasures and have a large capacitance density as the first capacitors. By using such a capacitor, it is possible to ensure the ripple suppression capacitance without requiring an additional component as a vibration countermeasure, and thus it is possible to achieve a more inexpensive filter configuration.

The size of the second capacitor may be equal to or more than 1005 (1.0 mm×0.5 mm) and equal to or less than 1608

(1.6 mm×0.8 mm). As described above, in order to suppress the switching noise, the second capacitor places importance on filter characteristics at high frequencies. For this purpose, it is desired to minimize the parasitic inductance. In addition, since it is desired to arrange the first substrate screwing part 50 and the second substrate screwing part 60 as close as possible, the size of the second capacitor between these screwing parts is preferably small. However, in a case of a size of less than 1005 (1.0 mm×0.5 mm), there is a high possibility of breakage due to distortion or vibration of the substrate. Therefore, as the second capacitor, a capacitor that maintains high reliability and has a small size equal to or more than 1005 (1.0 mm×0.5 mm) and equal to or less than 1608 (1.6 mm×0.8 mm) may be selected. Thus, it is possible to achieve a more inexpensive filter configuration while minimizing the parasitic inductance.

<Supplementary Note>

Some aspects of the various embodiments described above are summarized as follows.

(Supplementary Note 1)

A power conversion device (1; 1M; 1 MM) of Supplementary Note 1 is a power conversion device (1) including a power conversion circuit (10) including a plurality of semiconductor elements, a smoothing circuit unit (150) including a plurality of output capacitors (154, 155), a positive-side conductor (170) having at least one bent structure, and a negative-side conductor (70), a positive-side output terminal (200), a negative-side output terminal (GND 2), and a substrate (500) including a first substrate connecting part (50) and at least one second substrate connecting part (60), in which a first end of the positive-side conductor is connected to a positive-side output of the power conversion circuit (connection point 20), and a second end of the positive-side conductor is connected to the positive-side output terminal (200), a first end of the negative-side conductor is connected to a negative-side output of the power conversion circuit (second substrate connecting part), and a second end of the negative-side conductor is connected to the negative-side output terminal, the plurality of output capacitors is mounted on the substrate, a first end of each of the output capacitors is connected to the positive-side conductor at a first substrate connecting part, and a second end of the each of the output capacitors is connected to the negative-side conductor at the at least one second substrate connecting part, the plurality of output capacitors includes one or more first capacitors (154) and one or more second capacitors (155) smaller in size than the first capacitors, a shortest distance (A) between the first substrate connecting part and the second substrate connecting part on the substrate is shorter than an inter-terminal length (C) of the first capacitor and longer than an inter-terminal length (B) of the second capacitor, and the second capacitor is mounted between the first substrate connecting part and the second substrate connecting part.

(Supplementary Note 2)

The power conversion device (1; 1M; 1MM) of Supplementary Note 2 is the power conversion device according to Supplementary Note 1, in which a resonance frequency of the second capacitor is higher than a resonance frequency of the first capacitor.

(Supplementary Note 3)

The power conversion device (1; 1M; 1MM) of Supplementary Note 3 is the power conversion device according to Supplementary Note 1 or 2, in which the first capacitor and the second capacitor are both a ceramic capacitor.

(Supplementary Note 4)

The power conversion device (1M) of Supplementary Note 4 is the power conversion device according to any one of Supplementary Notes 1 to 3, in which the one or more first capacitors include two or more capacitors (158, 159) connected in series, and the one or more second capacitors include two or more capacitors (156, 157) connected in series.

(Supplementary Note 5)

The power conversion device (1; 1M; 1MM) of Supplementary Note 5 is the power conversion device according to any one of Supplementary Notes 1 to 4, in which a size of the first capacitor is equal to or more than 3.2 mm×1.6 mm and is equal to or less than 3.2 mm×2.5 mm, and a size of the second capacitor is equal to or more than 1.0 mm×0.5 mm and is equal to or less than 1.6 mm×0.8 mm.

(Supplementary Note 6)

The power conversion device (1; 1M; 1MM) of Supplementary Note 6 is the power conversion device according to any one of Supplementary Notes 1 to 5, further including a connection member (310, 320) having a connecting position with the substrate at both ends, in which the first substrate connecting part is connected to the positive-side conductor via the connection member by fixing the connection member to the positive-side conductor with a screw, or the second substrate connecting part is connected to the negative-side conductor via the connection member by fixing the connection member to the negative-side conductor with a screw.

(Supplementary Note 7)

The power conversion device (1; 1M; 1MM) of Supplementary Note 7 is the power conversion device according to any one of Supplementary Notes 1 to 6, in which the first capacitor is mounted immediately near the first substrate connecting part and the second substrate connecting part.

(Supplementary Note 8)

The power conversion device (1; 1M; 1MM) of Supplementary Note 8 is the power conversion device according to any one of Supplementary Notes 1 to 7, in which the first capacitor and the second capacitor are mounted on the same side with respect to the substrate.

(Supplementary Note 9)

The power conversion device (1; 1M; 1MM) of Supplementary Note 9 is the power conversion device according to any one of Supplementary Notes 1 to 8, in which the at least one second substrate connecting part includes two or more second substrate connecting parts, and the first capacitor and the second capacitor are mounted between the first substrate connecting part and the two or more second substrate connecting parts.

(Supplementary Note 10)

The power conversion device (1; 1M; 1MM) of Supplementary Note 10 is the power conversion device according to any one of Supplementary Notes 1 to 9, in which the first substrate connecting part and the second substrate connecting part are located at an end portion of the substrate.

(Supplementary Note 11)

The power conversion device (1; 1M; 1MM) of Supplementary Note 11 is the power conversion device according to any one of Supplementary Notes 1 to 10, in which the positive-side conductor has a bent structure (300, 400) between the first substrate connecting part and a positive-side output of the power conversion circuit.

(Supplementary Note 12)

The power conversion device (1; 1M; 1MM) of Supplementary Note 12 is the power conversion device according to any one of Supplementary Notes 1 to 11, in which the negative-side conductor has the same potential as a casing that is a GND.

(Supplementary Note 13)

The power conversion device (1MM) of Supplementary Note 13 is the power conversion device according to any one of Supplementary Notes 1 to 12, further including a ferrite core (171) disposed between a positive-side output (20) of the power conversion circuit and a connection point (40) of the positive-side conductor with the first substrate connecting part, and a capacitor (172) that connects a position between the positive-side output of the power conversion circuit and a position where the ferrite core is disposed and a GND.

Note that the embodiments can be combined, and each of the embodiments can be appropriately modified or omitted.

INDUSTRIAL APPLICABILITY

A power conversion device of the present disclosure can be used as a power conversion device for a mobile object such as an electric vehicle or an aircraft.

REFERENCE SIGNS LIST 1 (1C; 1M; 1MM): power conversion device, 10: power conversion circuit, 20: connection point, 30: connection point, 40: positive-side output connection point, 50: first substrate screwing part (connection point), 60: second substrate screwing part, 70: negative-side conductor, 80: connection point, 100: DC power supply, 110: input filter circuit unit, 111: capacitor, 112: capacitor, 120: switching circuit unit, 121 to 124: switching element, 130: transformer unit, 131: primary winding, 132: secondary winding, 140: rectifier circuit unit, 141: diode, 150 (150C): smoothing circuit unit, 151: smoothing reactor, 152: smoothing capacitor, 153: wiring member, 154: first capacitor (smoothing capacitor), 155: second capacitor (smoothing capacitor), 156 to 159: capacitor (smoothing capacitor), 160: output filter unit, 161: ferrite core, 162: capacitor, 163: branch point, 170: positive-side output bus bar, 171: ferrite core, 172: capacitor, 173: branch point, 200: output terminal, 300: bent structure, 310: second lug terminal, 310a: third substrate connection point, 310b: fourth substrate connection point, 320: first lug terminal, 320a: first substrate connection point, 320b: second substrate connection point, 500: substrate

The invention claimed is:

1. A power conversion device comprising:
a power conversion circuit including a plurality of semiconductor elements;
a smoothing circuit including a plurality of output capacitors, a positive-side conductor having at least one bent structure, and a negative-side conductor;
a positive-side output terminal;
a negative-side output terminal; and
a substrate including a first substrate connecting part and at least one second substrate connecting part, wherein
a first end of the positive-side conductor is connected to a positive-side output of the power conversion circuit, and a second end of the positive-side conductor is connected to the positive-side output terminal,
a first end of the negative-side conductor is connected to a negative-side output of the power conversion circuit, and a second end of the negative-side conductor is connected to the negative-side output terminal,
the plurality of output capacitors is mounted on the substrate, a first end of each of the output capacitors is connected to the positive-side conductor at the first substrate connecting part, and a second end of the each of the output capacitors is connected to the negative-side conductor at the at least one second substrate connecting part, the plurality of output capacitors includes one or more first capacitors and one or more second capacitors smaller in size than the first capacitors, a shortest distance between the first substrate connecting part and the second substrate connecting part on the substrate is shorter than an inter-terminal length of the first capacitor and longer than an inter-terminal length of the second capacitor, and the second capacitor is mounted between the first substrate connecting part and the second substrate connecting part.

2. The power conversion device according to claim 1, wherein a resonance frequency of the second capacitor is higher than a resonance frequency of the first capacitor.

3. The power conversion device according to claim 2, wherein the first capacitor and the second capacitor are both a ceramic capacitor.

4. The power conversion device according to claim 3, wherein
the one or more first capacitors include two or more capacitors connected in series, and
the one or more second capacitors include two or more capacitors connected in series.

5. The power conversion device according to claim 3, wherein
a size of the first capacitor is equal to or more than 3.2 mm×1.6 mm and is equal to or less than 3.2 mm×2.5 mm, and
a size of the second capacitor is equal to or more than 1.0 mm×0.5 mm and is equal to or less than 1.6 mm×0.8 mm.

6. The power conversion device according to claim 3, further comprising a connection member having a connecting position with the substrate at both ends, wherein
the first substrate connecting part is connected to the positive-side conductor via the connection member by fixing the connection member to the positive-side conductor with a first screw, or
the second substrate connecting part is connected to the negative-side conductor via the connection member by fixing the connection member to the negative-side conductor with a second screw.

7. The power conversion device according to claim 1, wherein the first capacitor is mounted immediately near the first substrate connecting part and the second substrate connecting part.

8. The power conversion device according to claim 1, wherein the first capacitor and the second capacitor are mounted on a same side with respect to the substrate.

9. The power conversion device according to claim 1, wherein the at least one second substrate connecting part includes two or more second substrate connecting parts, and the first capacitor and the second capacitor are mounted between the first substrate connecting part and the two or more second substrate connecting parts.

10. The power conversion device according to claim 1, wherein the first substrate connecting part and the second substrate connecting part are located at an end portion of the substrate.

11. The power conversion device according to claim 1, wherein the positive-side conductor has a bent structure between the first substrate connecting part and a positive-side output of the power conversion circuit.

12. The power conversion device according to claim 2, wherein the positive-side conductor has a bent structure between the first substrate connecting part and a positive-side output of the power conversion circuit.

13. The power conversion device according to claim 3, wherein the positive-side conductor has a bent structure between the first substrate connecting part and a positive-side output of the power conversion circuit.

14. The power conversion device according to claim 4, wherein the positive-side conductor has a bent structure between the first substrate connecting part and a positive-side output of the power conversion circuit.

15. The power conversion device according to claim 5, wherein the positive-side conductor has a bent structure between the first substrate connecting part and a positive-side output of the power conversion circuit.

16. The power conversion device according to claim 6, wherein the positive-side conductor has a bent structure between the first substrate connecting part and a positive-side output of the power conversion circuit.

17. The power conversion device according to claim 1, wherein the negative-side conductor has a same potential as a casing that is a ground.

18. The power conversion device according to claim 1, further comprising:

a ferrite core disposed between a positive-side output of the power conversion circuit and a connection point of the positive-side conductor with the first substrate connecting part; and a third capacitor that connects a position between the positive-side output of the power conversion circuit and a position where the ferrite core is disposed and a ground.

* * * * *